Richard H. A. Schoonover
INVENTOR

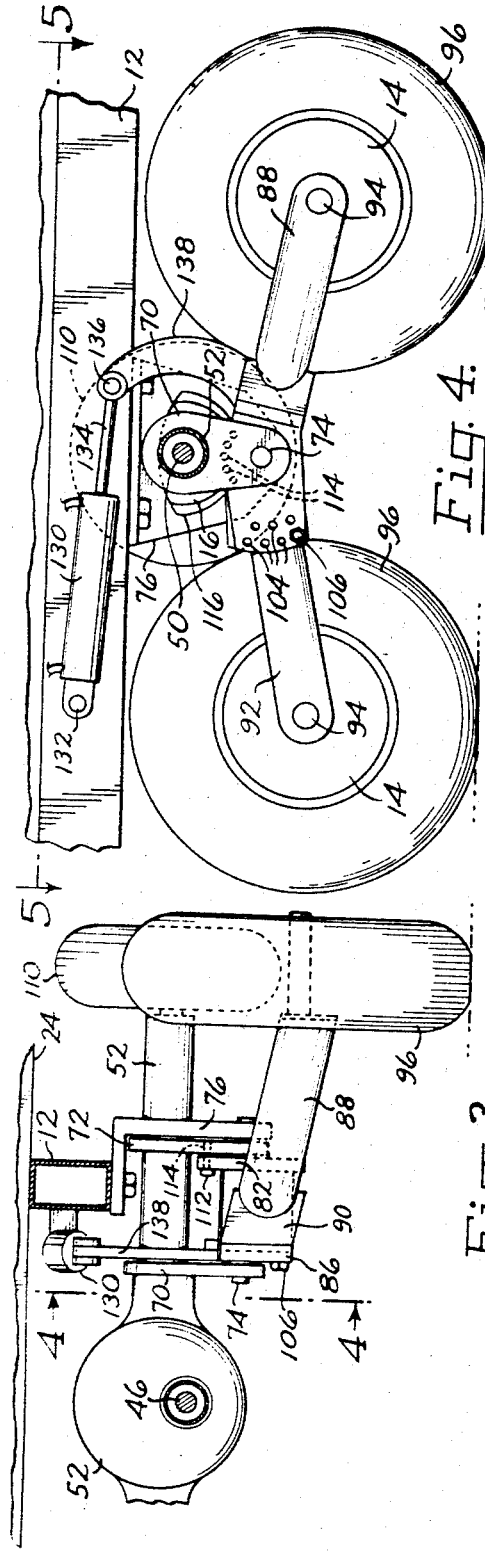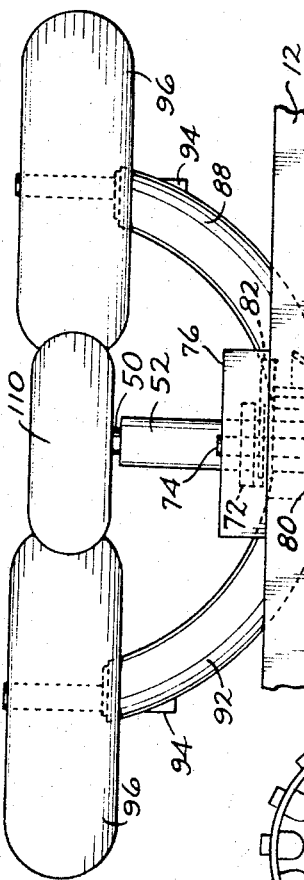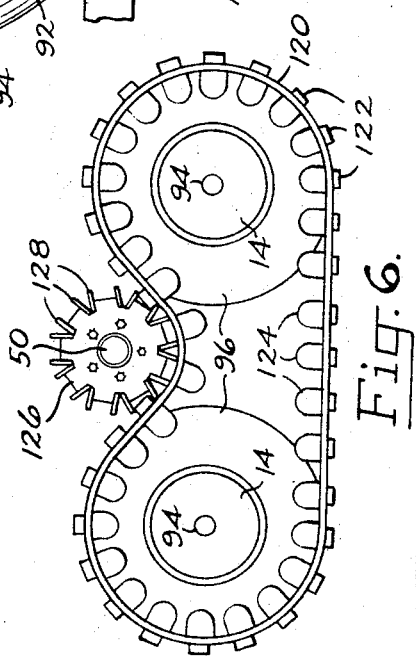

United States Patent Office 3,446,302
Patented May 27, 1969

3,446,302
VEHICLE DRIVE SYSTEM
Richard H. A. Schoonover, Albany, Oreg., assignor to Katrak Vehicle Company, Albany, Oreg., a corporation of Oregon
Filed Aug. 15, 1967, Ser. No. 660,827
Int. Cl. B62d 61/10
U.S. Cl. 180—9.2                    8 Claims

ABSTRACT OF THE DISCLOSURE

A pair of longitudinally spaced driving wheels are supported independently on coaxilly pivoted arms secured together for relative angular adjustment for varying the spacing between wheels to bring the latter operatively into driving engagement with an interposed driven wheel. The driving and driven wheels may include pneumatic tires, or the driving wheels may support an endless track and the driven wheel a track driving sprocket. A fluid pressure piston-cylinder unit interconnecting the vehicle frame and one of the arms is operable to pivot the interconnected arms to raise or lower the driving wheels.

Background of the invention

This invention relates to vehicle drive systems, and more particularly to a vehicle drive system for driving both wheels of a tandem wheel assembly including either pneumatic tires or track laying members.

Vehicle drive systems have been provided heretofore for driving a track laying member mounted on spaced wheels, and also for driving one of a pair of tandem wheels including pneumatic tires. However, no known drive system has been provided heretofore which affords the selective driving either of a track laying member or of both wheels of a tandem arrangement of pneumatic tires.

Moreover, vehicle drive systems provided heretofore for driving a track laying member mounted on spaced wheels are characterized by difficult, time consuming and costly procedures for mounting and dismounting the track laying member.

Still further, vehicle drive systems provided heretofore for driving a track laying member mounted on spaced wheels have experienced difficulty in maintaining track tension and driving connection between the track laying member and the drive sprocket during pivoting of the wheels as the vehicle traverses uneven terrain and as the vehicle is operated under high torque conditions.

Summary of the invention

In its basic concept the present invention involves the mounting of a pair of spaced wheels for adjustment relative to an interposed driven wheel, whereby the latter may engage pneumatic tires on the wheels or a track laying member supported by the wheels. The cooperative arrangement of the driving and driven wheels is such that positive driving engagement is maintained at all times.

It is the principal object of the present invention to provide a drive system by which a vehicle may be modified with speed and facility for propulsion either on pneumatic tires or on track laying members.

Another important object of this invention is the provision of a vehicle drive system in which both ground engaging pneumatic tires of a tandem assembly are driven simultaneously by frictional engagement with a pneumatic tire on a driven wheel.

Still another important object of the present invention is the provision of a vehicle drive system in which means is provided for mounting an endless track laying member on longitudinally spaced pneumatic tires of a tandem wheel assembly for engagement with a driven sprocket.

A further important object of this invention is the provision of a track laying vehicle drive system in which means is provided for maintaining substantially uniform track tension and positive driving connection between the track laying member and drive sprocket.

The foregoing and other objects and advantages of the present invention will appear from the following detailed description, taken in connection with the accompanying drawings of preferred embodiments of this invention.

Brief description of the drawings

FIG. 3 is a fragmentary end elevation of the vehicle drive system illustrated in FIG. 1.

FIG. 4 is a fragmentary sectional view taken on the line 4—4 in FIG. 3.

FIG. 5 is a fragmentary plan view as viewed from line 5—5 in FIG. 4.

FIG. 6 is a side elevation illustrating the conversion of the drive assembly of the preceding views to a track laying system.

Description of the preferred embodiments

Figure 2:
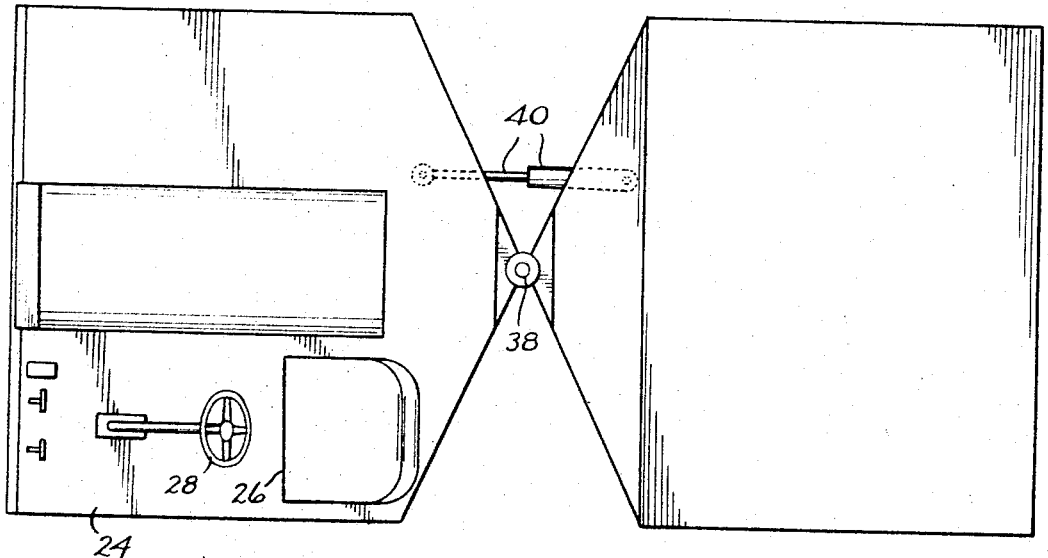
FIGS. 1 and 2 are views in side elevation and plan, respectively, of a tandem type vehicle incorporating therewith a vehicle drive system embodying the features of the present invention.
Figure 1:
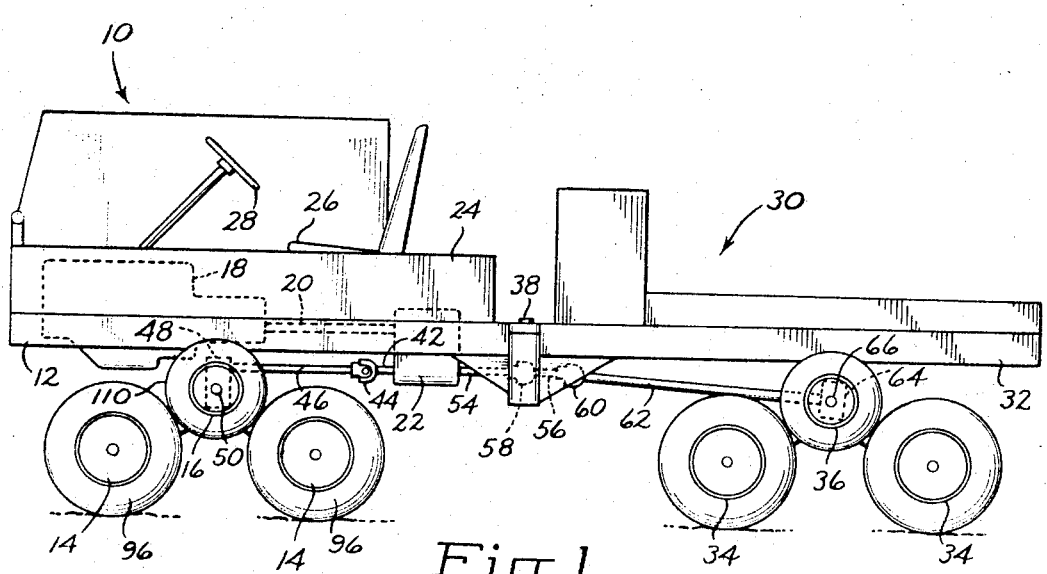

In FIGS. 1 and 2 of the drawings there is illustrated a pair of vehicles arranged in tandem. One of the vehicles, for example the forward vehicle 10, includes a frame 12 supported upon laterally spaced pairs of driving wheels 14 which are engaged by the driven wheel 16. The frame supports an internal combustion engine 18 or other suitable source of rotary power, the output shaft 20 of which is connected to conventional clutch and transmission mechanism 22. The frame also supports the body 24 having a driver's compartment including the seat 26 and steering wheel 28.

The rear vehicle 30 includes a frame 32 supported upon laterally spaced pairs of driving wheel 34 engaging the driven wheel 36.

The adjacent ends of the vehicle frames are coupled together for relative pivotal movement on a vertical axis 38 for steering of the tandem assembly by means of the extensible fluid pressure piston-cylinder unit 40. The coupling also provides for relative rotational displacement of the vehicles on a horizontal longitudinal axis to accommodate movement of the assembly over rough terrain. However, the coupling is such as to prevent relative pivotal movement of the vehicles on a transverse horizontal axis, thereby rendering the coupled vehicles substantially rigid in their longitudinal direction.

Means is provided for connecting the wheels of both vehicles to a common source of power, to provide simultaneous driving traction to the wheels of both vehicles. In the embodiment illustrated a drive rod section 42 extends forwardly from the transmission mechanism 22 and is coupled through the universal joint 44 to the drive rod section 46. This section is operatively connected through a differential 48 to each of the transverse driven shaft 50 which mount the driven wheels 16 of the forward vehicle 10. Since the housing 52 for the differential 48 and driven shafts 50 is supported for movement, as explained hereinafter, it will be understood that a conventional spline and universal joint connection (not shown) is provided between the differential 48 and drive rod section 46.

A drive rod section 54 also projects rearwardly from the transmission mechanism 22 and is connected to a drive rod section 56 through a conventional quick-disconnect universal joint 58 which is aligned axially with the vertical pivot 38 of the coupling. The drive rod section 56 is connected through the universal joint 60 to the rearward drive rod section 62. This section, in turn, is operatively connected through a conventional spline and universal joint to the differential 64 which connects the transverse driven shafts 66 for the driven wheels 36 of the rear vehicle 30.

The drive system of the present invention includes a pair of identical units for each vehicle illustrated, one unit being associated with each of the transverse driven shafts supporting the driven wheels. For simplicity, FIGS. 3, 4 and 5 of the drawings illustrate only one of said units associated with the forward vehicle. The unit includes a pair of transversely spaced pivot support plates 70, 72 welded or otherwise firmly secured to the driven shaft housing 52 and extending downwardly therefrom. A pivot shaft 74 extends between and is supported by the plates, and is journaled in the support bracket 76 which is secured to the vehicle frame 12.

Mounted on the pivot shaft for independent rotation relative to each other are a pair of concentric sleeve members 78 and 80. The inner sleeve member 78 is longer than the outer sleeve member 80 whereby opposite end portions of the inner sleeve member project beyond the outer sleeve member. End plates 82 and 84 on the projecting end portions of the inner sleeve member are joined together by the connecting plate 86 which extends along the outer surface of the outer sleeve member. To this connecting plate is welded or otherwise rigidly secured the inner end of a wheel support arm 88. Additional structural support of the arm is provided by welding to the extending end of the plate 82 the diagonal brace plate 90.

To the outer sleeve 80 is welded or otherwise rigidly secured the inner end of a second wheel support arm 92. The pair of arms extend in opposite directions from the pivot shaft 74 in the longitudinal direction of the vehicle frame and their outer ends project laterally outward from the frame. The outer ends of the support arms support stub shafts 94 which are disposed substantially parallel to the pivot shaft 74. Each of the stub shafts supports one of the wheels 14 rotatably thereon, and each wheel includes a pneumatic tire 96. The pair of longitudinally spaced wheels thus form a tandem wheel assembly.

Means is provided for securing the wheel support arms 88 and 92 together in various positions of relative angular adjustment. In the embodiment illustrated a pair of locking plates 100 and 102 are secured one to each of the concentric sleeves 78 and 80, respectively. Locking plate 100 is formed as an extension of end plate 84. The locking plates project radially from the sleeves and are disposed closely adjacent together. A plurality of openings 104 are provided in each of the plates adjacent the outer ends thereof. Each opening in one of the plates is arranged to register with an opening in the other plate at predetermined positions of relative angular adjustment of the support arms. A locking bolt 106 then is passed through the registering openings to secure the plates, and hence the support arms together. When thus locked together the pair of support arms form a unitary walking beam structure.

Means also is provided for releasably and adjustably securing the support plate 72 to one of the wheel support arms, in order to insure positive driving engagement between the driving tires 96 and the driven tire 110 mounted on the driven wheel 16, as the walking beam structure pivots about the pivot shaft 74 during traverse of the vehicle over uneven terrain. In the embodiment illustrated this means is provided by a pin 112 mounted retractably in the end plate 82 for insertion selectively in one of a plurality of openings 114 in the support plate 72. By this means the support plate 72 is secured releasably and adjustably to the wheel support arm 88. Thus, when the walking beam structure pivots about the shaft 74 the support plate 72 pivots with it. Since this plate and its associated plate 70 both are secured to the housing 52 of the differential and driven shafts, the latter also are moved arcuately about the shaft 74. An arcuate slot 116 is provided in the support bracket 76 to receive the housing 52 therethrough and permit said arcuate movement. Accordingly the driven tire 110 is maintained in positive frictional engagement with both of the driving tires 96 at all times.

Installation of the driving wheel and tire assembly and its adjustment into positive engagement with the driving tires is accomplished simply by jacking up the vehicle frame to elevate the tandem wheels from the ground, and retracing the locking bolt 106 and locking pin 112 to allow the wheel support arms 88 and 92 to swing downward. Upon installation of the desired driven wheel assembly on the driven shaft 50, the vehicle frame is lowered to bring the tandem wheel upward into engagement with the driven wheel. The locking bolt and pin then are reinstalled in the appropriate registering openings.

The drive system described hereinbefore also accommodates conversion of the trandem wheel assembly to a track laying type assembly. Referring to FIG. 6 of the drawing the pneumatic tires of the tandem wheel assembly serve to mount an endless track member 120. The track member comprises a plurality of pivotally interconnected links each of which supports an outwardly projecting ground gripping lug 122, in manner well known in the art. Each link also supports a pair of laterally spaced inwardly projecting guides plates 124 which serve to straddle and confine between them the outer peripheral portion of the pneumatic tires of the tandem driving wheels. These guide plates thus serve to maintain the track member properly aligned on the driving wheels.

The endless track member is installed on the tandem wheels with speed and facility simply by jacking up the vehicle frame and removing the locking bolt 106 and pin 112 to allow the wheels to swing together about the axis of the pivot shaft 74. The distance between the wheels thus is shortened sufficiently to permit easy installation of the track member. The support arms then are swung away from each other, moving the driving wheels apart and stretching the endless track member between them. The locking bolt and pin then are secured in the appropriately aligned pairs of openings.

The pneumatic tired driven wheel illustrated in FIGS. 3, 4 and 5 is replaced by a sprocket wheel 126 having projecting teeth 128 arranged to engage the outwardly projecting lugs 122 on the endless track member. By virtue of the frictional engagement of the track member with the pneumatic tires of the idling tandem driving wheels the latter are rotated with the track member by the driven sprocket wheel. Additionally, since the support plates 70, 72 pivot about the pivot shaft 74 simultaneously with the support arms and driving wheels, the sprocket is maintained continuously in proper driving engagement with the track.

Although the pneumatic tires of the tandem driving wheels may be replaced with conventional track supporting wheels, the pneumatic tires illustrated are preferred for their contribution to a softer ride.

Since the interconnected support arms 88, 92 pivot freely as a unit about the pivot shaft 74, it will be appreciated that a single pair of such units cannot support a vehicle in stable condition. Thus, for example, when such a pair of units supports a vehicle such as the forward vehicle 10 illustrated in FIG. 1, said vehicle must always be coupled on a substantially rigid transverse axis to another supporting unit. Such a supporting unit is illustrated in FIG. 1 by the rear vehicle 30. The supporting unit may simply be a rearward extension of the forward vehicle supported upon rear wheels or tracks, or it may be a farm implement such as a harvester, harrow, disc, etc.

However, in accordance with the present invention means may be included in the drive system described hereinbefore for preventing or controlling the pivotal movement of the interconnected support arms about the pivot shaft. In the embodiment illustrated a fluid pressure cylinder 130 is secured, as by the pivot pin 132, to the vehicle frame 12, and the piston rod 134 extending from the opposite end thereof is connected by the pivot pin 136 to the projecting end of the arm 138. The opposite end of this arm is secured to the connecting plate 86 adjacent the diagonal brace plate 90. This assembly is duplicated for each pair of tandem wheels, and conventional control valves (not shown) connect fluid pressure lines at opposite ends of each cylinder to a source of fluid pressure.

Thus, referring particularly to FIG. 4 of the drawings, hydraulic fluid pressure may be employed in the cylinder to secure the interconnected support arms against pivotal movement about the pivot shaft 74. In this condition the forward vehicle illustrated in FIG. 1 is completely stable and therefore may be disconnected from a supporting unit such as the rear vehicle 30 and maneuvered about by itself.

The piston-cylinder unit also affords controlled pivoting of the interconnected support arms about the pivot shaft. Thus, still referring to FIG. 4 of the drawings, retraction of the piston rod 134 into the cylinder effects counterclockwise rotation of the interconnected support arms and driving wheels about the pivot shaft 74, thereby elevating the right hand driving wheel above the ground. Assuming this is the wheel that leads in the direction of movement of the vehicle, such elevation facilitates traverse of the vehicle over logs, rocks, and other obstacles. Further, by raising the forward wheels of the tandem pairs, the rear wheels provide high speed travel of the vehicle. By utilizing compressed air over hydraulic fluid in the cylinders, as is well known, the interconnected support arms may pivot through a limited arc to absorb shocks and thus provide a smooth ride over uneven terrain. This arrangement also allows the front wheels to raise to a limited degree, thereby offering an angle of approach to obstacles at higher speeds of travel.

It will be apparent to those skilled in the art that various changes may be made in the size, shape, number and arrangement of parts described hereinbefore. For example, the pin 112, openings 114 and slot 116 may be omitted if it is not desired that the support plate 72 be secured to the wheel support arm to pivot the driven shaft 50 therewith. The arrangement illustrated is preferred for use of the vehicle on very rough terrain. However, the fixed driven shaft arrangement may be preferred under such conditions as when pulling very heavy loads, wherein the fixed driven sprocket prevents the "walking" of the track beyond the limit at which the trailing driving wheel abuts the driven sprocket. This and other changes may be made without departing from the spirit of this invention.

Having now described my invention and the manner in which it may be used, I claim:

1. A drive system for a vehicle having a frame and a power driven shaft supported by the frame, the drive system comprising
    (a) a pair of tandem wheel support arms,
    (b) pivot shaft means mounted on the frame,
    (c) means mounting the support arms at one end on the pivot shaft means for selective interconnected or independent pivotal movement, said means including,
    (d) adjustable means for adjusting the angular position on the arms relative to each other,
    (e) a driving wheel mounted rotatably on the opposite end of each arm, and
    (f) a driven wheel mounted on the driven shaft between said driving wheels having its lowermost peripheral portion between the upper and lowermost peripheral portions of the driving wheels, the driving wheel being in operative peripheral driving engagement with said driving wheels.

2. The drive system of claim 1 wherein the support arm mounting means comprise a pair of concentric sleeves mounted on a common pivot shaft and secured one to each support arm.

3. The drive system of claim 1 wherein the adjustable connecting means comprise adjacent parallel plates secured one to each support arm and each having a plurality of transverse openings, each opening in one plate being registrable with an opening in the other plate in selected positions of angular adjustment of the support arms, and locking bolt means receivable removably in registering pairs of said openings for releasably securing the support arms together.

4. The drive system of claim 1 wherein the driven wheel includes a pneumatic tire and the driving wheels include pneumatic tires.

5. The drive system of claim 1 wherein the driven wheel comprises a track-engaging sprocket, and endless track means is trained over the driving wheels.

6. The drive system of claim 1 wherein the driven wheel comprises a track-engaging sprocket, the driving wheels include pneumatic tires, and endless track means is trained over the pneumatic tires of the driving wheels.

7. The drive system of claim 1 including a fluid pressure piston-cylinder unit interconnecting the vehicle frame and one of the support arms and operable to pivot said arms about the axis of the pivot shaft.

8. The drive system of claim 7 wherein the piston-cylinder unit contains compressed air over hydraulic fluid.

References Cited

UNITED STATES PATENTS

| | | | |
|---|---|---|---|
| 1,255,218 | 2/1918 | Paulsen | 305—29 X |
| 2,124,708 | 7/1938 | Peter | 180—9.62 X |
| 2,380,181 | 7/1945 | Krenzien | 180—74 |
| 2,878,883 | 3/1959 | France | 180—9.44 |
| 3,107,924 | 10/1963 | Cushman | 305—20 X |
| 3,299,978 | 1/1967 | Sponsler | 180—9.52 |

FOREIGN PATENTS

Ad. 21,560  8/1920  France.

RICHARD J. JOHNSON, *Primary Examiner.*

U.S. Cl. X.R.

180—9.62, 74; 305—20, 10, 57, 29